United States Patent
Nelson

(10) Patent No.: US 9,441,678 B2
(45) Date of Patent: Sep. 13, 2016

(54) SHEARABLE DRIVE COUPLING ASSEMBLY

(71) Applicant: Matt Nelson, Volga, SD (US)

(72) Inventor: Matt Nelson, Volga, SD (US)

(*) Notice: Subject to any disclaimer, the term of this patent is extended or adjusted under 35 U.S.C. 154(b) by 332 days.

(21) Appl. No.: 14/179,626

(22) Filed: Feb. 13, 2014

(65) Prior Publication Data

US 2015/0226271 A1    Aug. 13, 2015

(51) Int. Cl.
*F16D 9/06* (2006.01)
*A01D 75/18* (2006.01)
*A01D 34/82* (2006.01)
*A01B 61/02* (2006.01)

(52) U.S. Cl.
CPC .............. *F16D 9/06* (2013.01); *A01D 75/182* (2013.01); *A01B 61/025* (2013.01); *A01D 34/828* (2013.01); *Y10T 403/11* (2015.01)

(58) Field of Classification Search
None
See application file for complete search history.

(56) References Cited

U.S. PATENT DOCUMENTS

| | | | | |
|---|---|---|---|---|
| 3,536,174 A | * | 10/1970 | Vance | F16D 9/06 192/46 |
| 4,357,137 A | | 11/1982 | Brown | |
| 4,947,972 A | * | 8/1990 | Lea | F16D 7/025 403/2 |
| 5,481,857 A | * | 1/1996 | Umemoto | A01D 34/81 56/12.6 |
| 5,715,662 A | * | 2/1998 | Walters | A01D 75/182 464/32 |
| 6,241,616 B1 | * | 6/2001 | Lightcap | F16C 3/03 403/359.5 |
| 6,390,925 B1 | * | 5/2002 | Perrow | F16D 1/112 403/316 |
| 6,675,563 B1 | * | 1/2004 | Ehrhart | A01D 34/664 56/10.3 |
| 6,718,745 B1 | * | 4/2004 | Adams | A01D 34/664 403/2 |
| 2003/0118443 A1 | * | 6/2003 | Chen | B63H 23/34 416/2 |
| 2009/0087257 A1 | * | 4/2009 | Harkcom | A01D 34/665 403/359.1 |
| 2012/0048687 A1 | * | 3/2012 | Boyd | A01D 75/182 198/832 |
| 2012/0282022 A1 | * | 11/2012 | Phebus | B23C 3/30 403/359.1 |

* cited by examiner

*Primary Examiner* — Elizabeth A Quast

(57) ABSTRACT

A shearable drive coupling assembly includes an adapter having a top end with a drive shaft well extending downwardly therein. A plurality of spindle splines extends outwardly from an outer surface of the adapter and a plurality of shaft splines extends inwardly from an inside surface of the adaptor. The plurality of spindle splines engage a receiver of an article of powered equipment. A drive shaft of a drive motor engages the shaft splines so that the adapter is coupled to the drive shaft and transfers a rotational torque between the drive shaft and the receiver. The plurality of spindle splines or the plurality of shaft splines shears away from the adapter to decouple the drive shaft from the receiver when the receiver is exposed to a trigger counter-rotational force to protect the receiver and the drive shaft from damage.

9 Claims, 5 Drawing Sheets

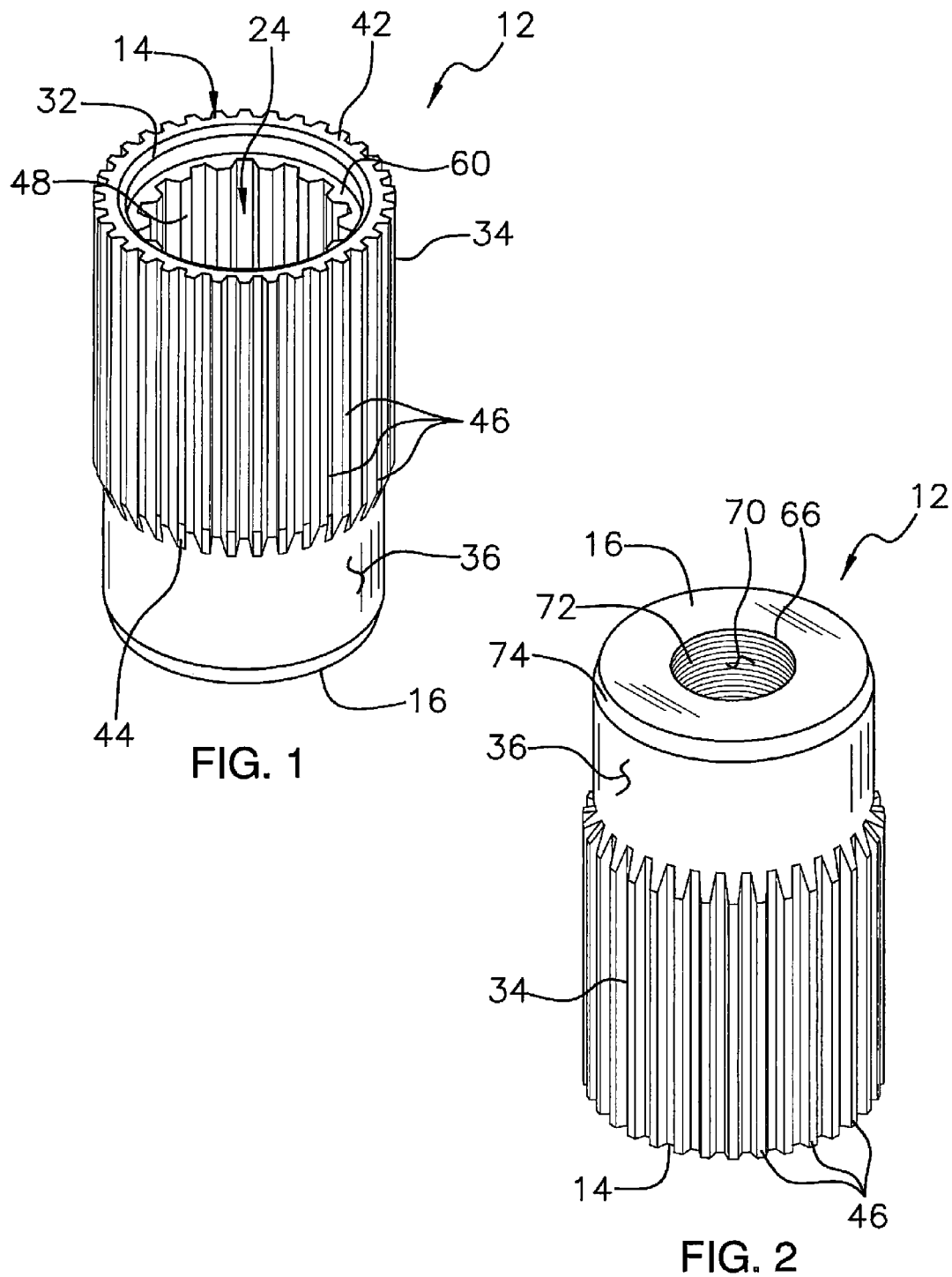

SHEARABLE DRIVE COUPLING ASSEMBLY

BACKGROUND OF THE DISCLOSURE

Field of the Disclosure

The disclosure relates to drive coupling devices and more particularly pertains to a new drive coupling device for coupling together a blade of a mowing deck with a drive motor and capable of decoupling from the drive motor under excessive torque.

SUMMARY OF THE DISCLOSURE

An embodiment of the disclosure meets the needs presented above by generally comprising an adapter that is elongated along a longitudinal axis extending through a top end and a bottom end of the adapter. The adapter is configured to be inserted into a receiver on an article of powered equipment. The adapter has a drive shaft well extending downwardly into a top end of the adapter. A plurality of spindle splines extends outwardly from an outer surface of the adapter and a plurality of shaft splines extends inwardly from an inside surface of the adaptor and extending into the drive shaft well. The bottom end of the adapter is configured to be slidably positionable within the receiver wherein the plurality of spindle splines on the adapter engages the receiver. The drive shaft well is configured to insertably receive a drive shaft of a drive motor wherein the plurality of shaft splines engages the drive shaft such that the adapter is coupled to the drive shaft. The adapter transfers a rotational torque between the drive shaft and the receiver. The plurality of spindle splines or the plurality of shaft splines shears away from the adapter to decouple the drive shaft from the receiver when the receiver is exposed to a trigger counter-rotational force to protect the receiver and the drive shaft from damage.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a top perspective view of a shearable drive coupling assembly according to an embodiment of the disclosure.

FIG. 2 is a bottom perspective view of an embodiment of the disclosure.

DESCRIPTION OF THE PREFERRED EMBODIMENT

Figure 3:
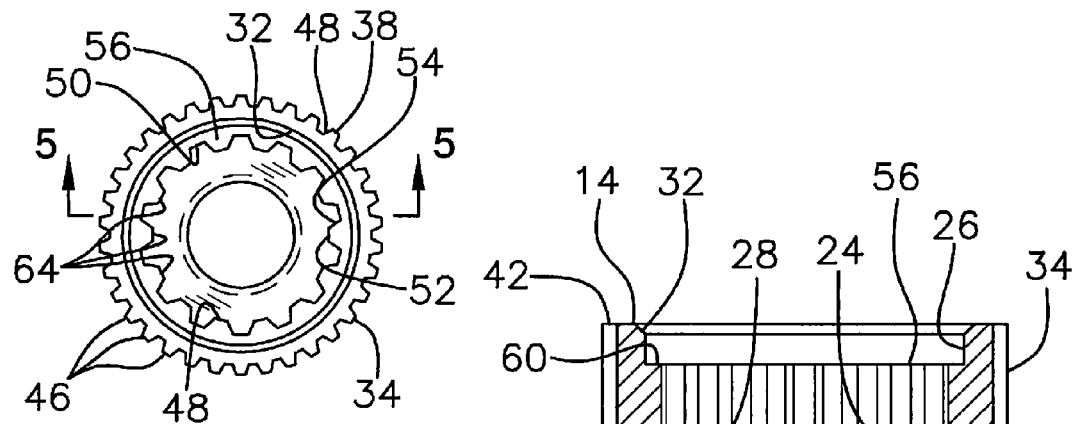
FIG. 3 is a top view of an embodiment of the disclosure.
Figure 4:
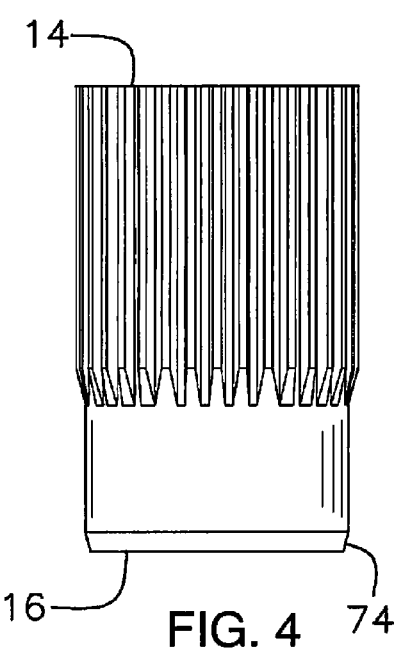
FIG. 4 is a right side view of an embodiment of the disclosure.

With reference now to the drawings, and in particular to FIGS. 1 through 8 thereof, a new drive coupling device embodying the principles and concepts of an embodiment of the disclosure and generally designated by the reference numeral 10 will be described.

As best illustrated in FIGS. 1 through 8, the shearable drive coupling assembly 10 generally comprises an adapter 12, elongated along a longitudinal axis extending through a top end 14 and a bottom end 16 of the adapter 12. The adapter 12 may be inserted into a receiver 18 on an article of powered equipment 20. The article of powered equipment 20 may comprise a rotary mower that is removably coupled to a vehicle, not shown, which may comprise a conventional tractor. The adapter 12 may have a length from the top end 14 to the bottom end between 5.0 cm and 9.0 cm and an outside diameter between 3.0 cm and 6.0 cm.

Figure 5:
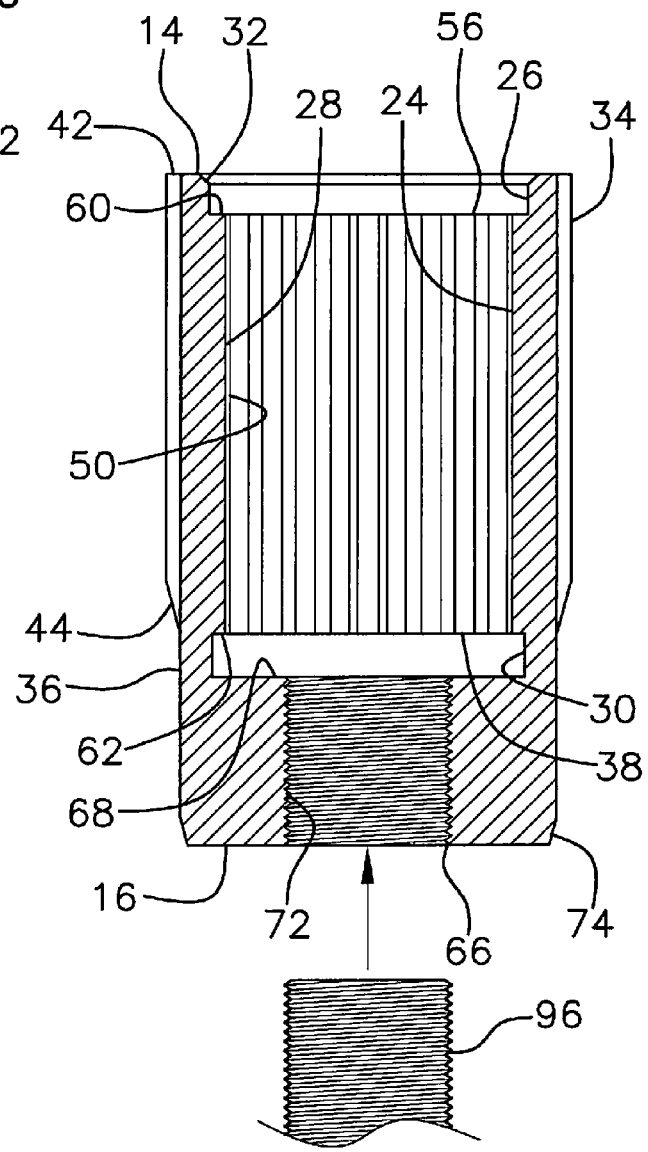
FIG. 5 is a cross sectional view taken along line 5-5 of FIG. 3 of an embodiment of the disclosure.
Figure 6:
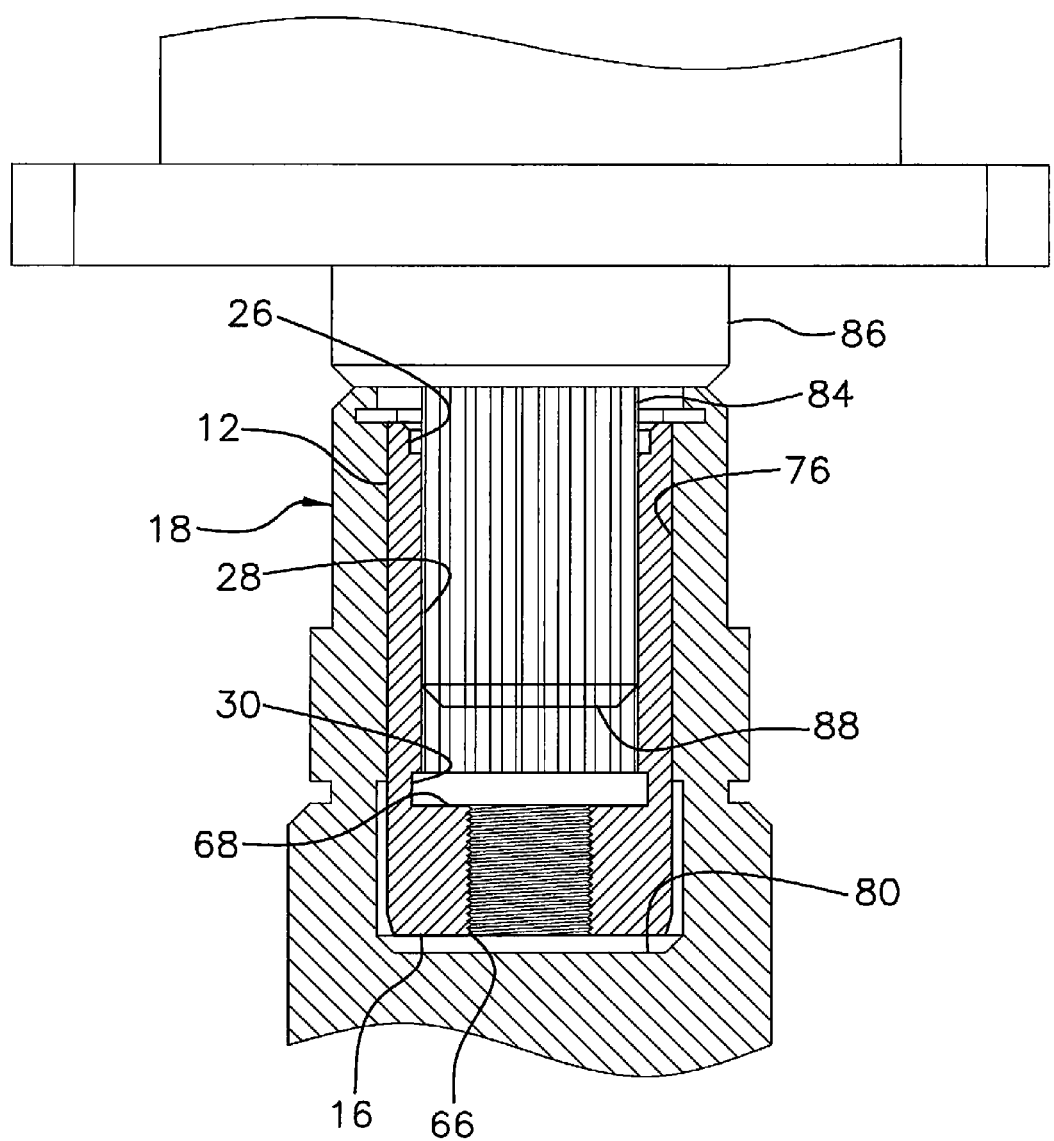
FIG. 6 is a right side cut-away view of an embodiment of the disclosure.
Figure 7:
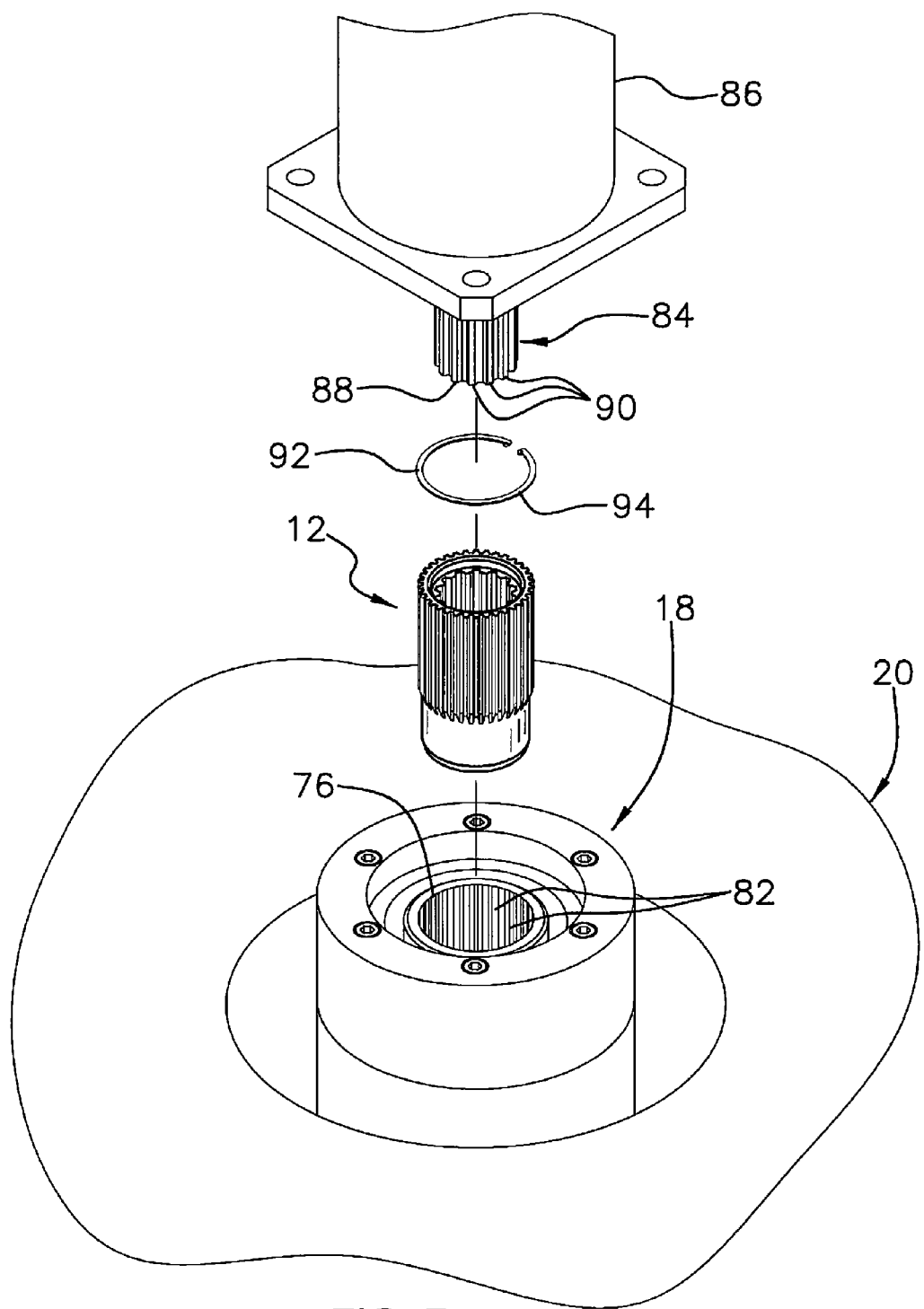
FIG. 7 is an exploded view of an embodiment of the disclosure.
Figure 8:
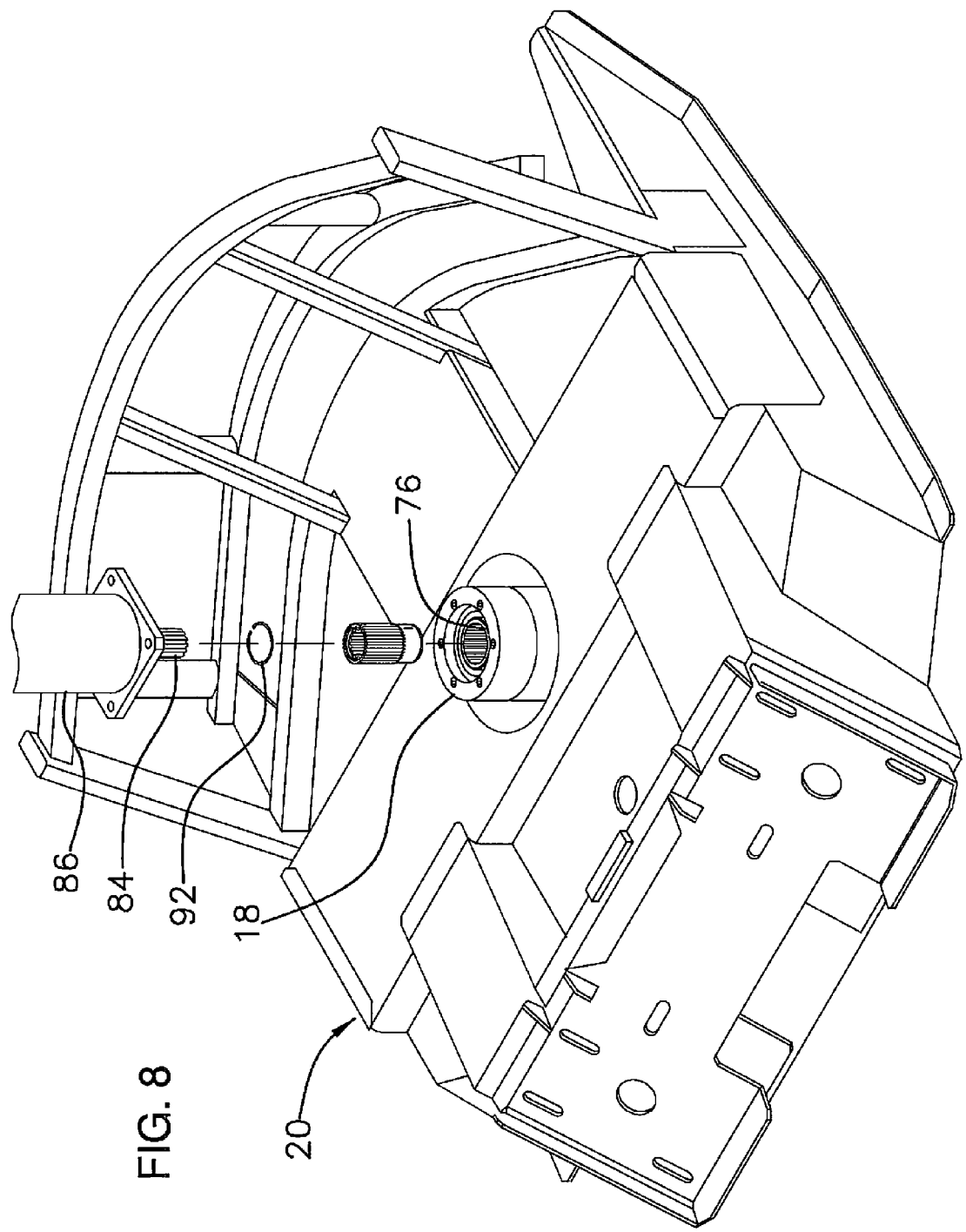
FIG. 8 is a perspective view of an embodiment of the disclosure.

The adapter 12 has a drive shaft well 24 extending downwardly into the top end 14 of the adapter 12. As can be seen in FIG. 5, a top portion 26 of the drive shaft well 24 adjacent to the top end 14 of the adapter 12 has a diameter that is greater than a diameter of a middle portion 28 of the drive shaft well 24. For example, the top portion 26 of the drive shaft well 24 may have an inside diameter between 3.2 cm and 3.7 cm while the middle portion 28 of the drive shaft well 24 may have an inside diameter between 2.50 cm and 3.0 cm. A bottom portion 30 of the drive shaft well 24, spaced from the bottom end 16, may have a diameter that is greater than the diameter of the middle portion 28 of the drive shaft well 24. A top edge 32 of the top portion 26 of the drive shaft well 24 is chamfered. The chamfer may be shallow, having a depth of between a depth less than 0.3 cm and having an angle between 40° and 70°. The top portion may have a depth between 1.0 cm and 2.0 cm, the middle portion 28 may have a depth between 4.0 cm and 5.0 cm, while the bottom portion 30 may be relatively shallow and have a depth of less than 1.0 cm.

A plurality of spindle splines 34 extends outwardly from an outer surface 36 of the adapter 12. Moreover, a distal edge 38 of the plurality of spindle splines 34 is defined with respect to the outer surface 36. The width of the distal edges 38 is less than the width of a base 40 of the spindle splines proximate to the outer surface 36 such that they narrow as they extend outwardly from the outer surface 36. The base 40 of the plurality of spindle splines 34 abuts the adapter 12. The plurality of spindle splines 34 may each have a trapezoidal cross section taken along a line perpendicular to a line extending through a front end 42 and a back end 44 of the plurality of spindle splines 34. The front end 42 is adjacent to the top end 14 while the back end 44 is defined as the terminal end of each of the spindle splines 34. The plurality of spindle splines 34 extends longitudinally between the top end 14 of the adapter 12 and an area adjacent to the bottom end 16 of the adapter 12. The spindle splines 34 may each have a length between 4.5 cm and 5.0 cm. The back ends 44 of the plurality of spindle splines 34 angle downwardly between the distal edges 38 and the bases 40 of the plurality of spindle splines 34. The spindle splines 34 are evenly spaced apart from each other and are evenly distributed around an entire circumference of the outer surface 36 of the adapter 12. The number of spindle splines 34 may vary but may comprise between thirty and forty spindle splines.

A plurality of shaft splines 48 extends inwardly from an inside surface 50 of adapter 12 and into the drive shaft well 24. Each of the plurality of shaft splines 48 has an inner edge 52 extending inwardly of the drive shaft well 24. Further, the plurality of shaft splines 48 has an increasing width from the inner edge 52 to the inside surface 50 of the adapter 12. The shaft splines 48 may also have a trapezoidal cross section taken perpendicular to a longitudinal axis each shaft spline 48. The shaft splines 48 extend longitudinally generally between an upper edge 60 of the middle portion 28 of the drive shaft well 24 and a lower edge 62 of the middle portion 28 of the drive shaft well 24. A front end 56 of the plurality of shaft splines 48, adjacent the top portion, may be angled inwardly and downwardly between the inner edge 52 and inside surface 50. The plurality of shaft splines 48 is evenly spaced apart from each other and distributed around an entire circumference of the inside surface 50 of the middle portion 28 of the drive shaft well 24. The plurality of shaft splines 48 may include between ten and twenty shaft splines 48.

The adapter 12 includes a fastener aperture 66 extending through the bottom end 16 of the adapter 12 and into the drive shaft well 24. The fastener aperture 66 may have an inside diameter between 1.8 cm and 2.2 cm and a depth between 1.5 cm and 2.2 cm. A wall surface 70 bounding the fastener aperture 66 is threaded. An outside edge 74 of the bottom end 16 of the adapter 12 may also be chamfered having a length less than 0.5 cm and forming an angle between 10° and 25°.

The bottom end 16 of the adapter 12 is slidably positionable within a shaft well 76 in the receiver 18 on the article of powered equipment 20. Additionally, the bottom end 16 of the adapter 12 is positioned proximate a bottom wall 80 of the shaft well 76 in the receiver 18. The plurality of spaced spindle splines 34 on the adapter 12 engages the receiver 18 so that the adapter 12 is removably placed in mechanical communication with the receiver 18. More particularly, the plurality of spaced spindle splines 34 engages a plurality of splines 82 in the receiver 18. The receiver 18 may be a spindled drive receiver of any conventional design.

The drive shaft well 24 in the adapter 12 insertably receives a drive shaft 84 on a drive motor 86 of the powered equipment. A bottom end 88 of the drive shaft 84 is positioned proximate the bottom portion 30 of the drive shaft well 24. The plurality of shaft splines 48 engages a plurality of splines 90 on the drive shaft 84 so that the adapter 12 is coupled to the drive shaft 84. The adapter 12 transfers a rotational torque from the drive shaft 84 to the receiver 18.

A retaining ring 92 is removably positionable within the top portion 26 of the drive shaft well 24. A bottom side 94 of the retaining ring 92 abuts the front end 56 of each of the plurality of shaft splines 48 and the retaining ring 92 engages the drive shaft 84 when the drive shaft 84 is inserted into the drive shaft well 24. The retaining ring 92 assists in retaining the drive shaft 84 in the drive shaft well 24.

The spindle splines 34 an/or the shaft splines 48 shear away from the adapter 12 when the receiver 18 is exposed to a trigger counter-rotational force with respect to the rotational torque transferred from the drive shaft 84. For example, the plurality of spindle splines 34 may have a maximum working shear force (i.e. the trigger) ranging between 5,100 in/lbs and 10,200 in/lbs while the maximum working shear force for the shaft splines may generally range between 7,200 in/lbs and 14,400 in/lbs. More generally, the spindle splines 34 have a maximum shear force less than the maximum shear force of the splines 82 on the receiver 18 and the shaft splines 48 have a maximum shear force less than the maximum shear force of the splines 90 on the drive shaft 84. Consequently, when a counter-rotational force is generated when the article of powered equipment 20 encounters resistance, such as from a rock, stump, heavy vegetation or other similar resiliently stationary object, the spindle splines 34 or the shaft splines 48 will shear to decouple the receiver 18 from the drive shaft 84 before damage is caused to the drive shaft 84 or receiver 18.

In use, the receiver 18 and drive shaft 84 are coupled together using the adapter 12. In the event of a failure of the plurality of spaced spindle spines 34, the receiver 18 is easily removed from the adapter 12 by threading a bolt 96 into the fastener aperture 66 until the bolt 96 engages the bottom end 88 of the drive shaft 84. As the bolt is rotated and moved upwardly, the bolt 96 urges the drive shaft 84 outwardly of the adapter 12. A replacement adapter 12 is then replaced in the receiver 18 and the drive shaft 84 is inserted into the replacement adapter 12. Thus, the adapter 12 acts as an intentional failure point to protect against having to replace either the receiver 18 or the drive shaft 84. Lastly, the adapter 12 decreases a cost and a downtime associated with a spline failure in the convention of the use of rotary mowers.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A shearable drive coupling assembly configured for coupling together a blade of a mowing deck with a drive motor and capable of decoupling from the drive motor under excessive torque, said assembly comprising:
    an adapter being elongated along a longitudinal axis extending through a top end and a bottom end of said adapter, said adapter being configured to be inserted into a receiver on an article of powered equipment;
    said adapter having a drive shaft well extending downwardly into a top end of said adapter;
    a plurality of spindle splines extending outwardly from an outer surface of said adapter;

a plurality of shaft splines extending inwardly from an inside surface of said adaptor and extending into said drive shaft well;

said bottom end of said adapter being configured to be slidably positionable within the receiver wherein said plurality of spindle splines on said adapter engages the receiver;

said drive shaft well being configured to insertably receive a drive shaft of a drive motor wherein said plurality of shaft splines engages the drive shaft such that said adapter is coupled to the drive shaft, wherein said adapter transfers a rotational torque between the drive shaft and the receiver;

said plurality of spindle splines or said plurality of shaft splines shearing away from said adapter to decouple the drive shaft from the receiver when the receiver is exposed to a trigger counter-rotational force such that the receiver and the drive shaft are protected from damage; and wherein said bottom end of said adapter has an aperture extending therein and into said drive shaft well, a wall surface bounding said aperture being threaded, a threaded rod threadably extended into said aperture and abutted against the drive shaft to urge the drive shaft outwardly from said adapter.

2. The shearable drive coupling assembly according to claim 1, wherein a top portion of said drive shaft well adjacent to said top end of said adapter having a diameter being greater than a diameter of a middle portion of said drive shaft well, a bottom portion of said drive shaft well having a diameter being greater than the diameter of said middle portion of said drive shaft well.

3. The shearable drive coupling assembly according to claim 2, wherein said shaft splines each extend between an upper edge of said middle portion of said drive shaft well and a lower edge of said middle portion of said drive shaft well.

4. The shearable drive coupling assembly according to claim 3, wherein said each of said shaft splines is evenly spaced from each other and distributed around an entire circumference of said inside surface of said drive shaft well.

5. The shearable drive coupling assembly according to claim 1, wherein each of said spindle splines includes a base abutting said outer surface and a distal edge with respect to said outer surface, said spindle spines each having a decreasing width from said bases to a corresponding one of said distal edges.

6. The shearable drive coupling assembly according to claim 1, wherein said spindle splines each extends longitudinally from said top end of said adapter to an area adjacent to said bottom end of said adapter.

7. The shearable drive coupling assembly according to claim 1, wherein said spindle splines are evenly spaced from each other and distributed around an entire circumference of said outer surface of said adapter.

8. The shearable drive coupling assembly according to claim 1, wherein each of said shaft splines has an inner edge extending inwardly of said drive shaft well, said shaft splines each having an increasing width from said inner edges to said inside surface.

9. A shearable drive coupling assembly configured for coupling together a blade of a mowing deck with a drive motor and capable of decoupling from the drive motor under excessive torque, said assembly comprising:

an adapter being elongated along a longitudinal axis extending through a top end and a bottom end of said adapter, said adapter being configured to be inserted into a receiver on an article of powered equipment;

said adapter having a drive shaft well extending downwardly into a top end of said adapter, a top portion of said drive shaft well adjacent to said top end of said adapter having a diameter being greater than a diameter of a middle portion of said drive shaft well, a bottom portion of said drive shaft well having a diameter being greater than the diameter of said middle portion of said drive shaft well;

a plurality of spindle splines extending outwardly from an outer surface of said adapter, each of said spindle splines including a base abutting said outer surface and a distal edge with respect to said outer surface, said spindle spines each having a decreasing width from said bases to a corresponding one of said distal edges, said spindle splines each extending longitudinally from said top end of said adapter to an area adjacent to said bottom end of said adapter;

said spindle splines being evenly spaced from each other and distributed around an entire circumference of said outer surface of said adapter;

a plurality of shaft splines extending inwardly from an inside surface of said adaptor and extending into said drive shaft well, each of said shaft splines having an inner edge extending inwardly of said drive shaft well, said shaft splines each having an increasing width from said inner edges to said inside surface, said shaft splines extending between an upper edge of said middle portion of said drive shaft well and a lower edge of said middle portion of said drive shaft well;

said plurality of shaft splines being evenly spaced from each other and distributed around an entire circumference of said inside surface of said drive shaft well;

said bottom end of said adapter having an aperture extending therein and into said drive shaft well, a wall surface bounding said aperture being threaded;

said bottom end of said adapter being configured to be slidably positionable within the receiver on an article of powered equipment wherein said plurality of spindle splines on said adapter engages the receiver;

said drive shaft well being configured to insertably receive a drive shaft of a drive motor wherein said plurality of shaft splines engages the drive shaft such that said adapter is coupled to the drive shaft, wherein said adapter transfers a rotational torque between the drive shaft and the receiver;

said plurality of spindle splines or said plurality of shaft splines shearing away from said adapter to decouple the drive shaft from the receiver when the receiver is exposed to a trigger counter-rotational force such that the receiver and the drive shaft are protected from damage; and a threaded rod threadably extended into said aperture and abutted against the drive shaft to urge the drive shaft outwardly from said adapter.

* * * * *